UNITED STATES PATENT OFFICE.

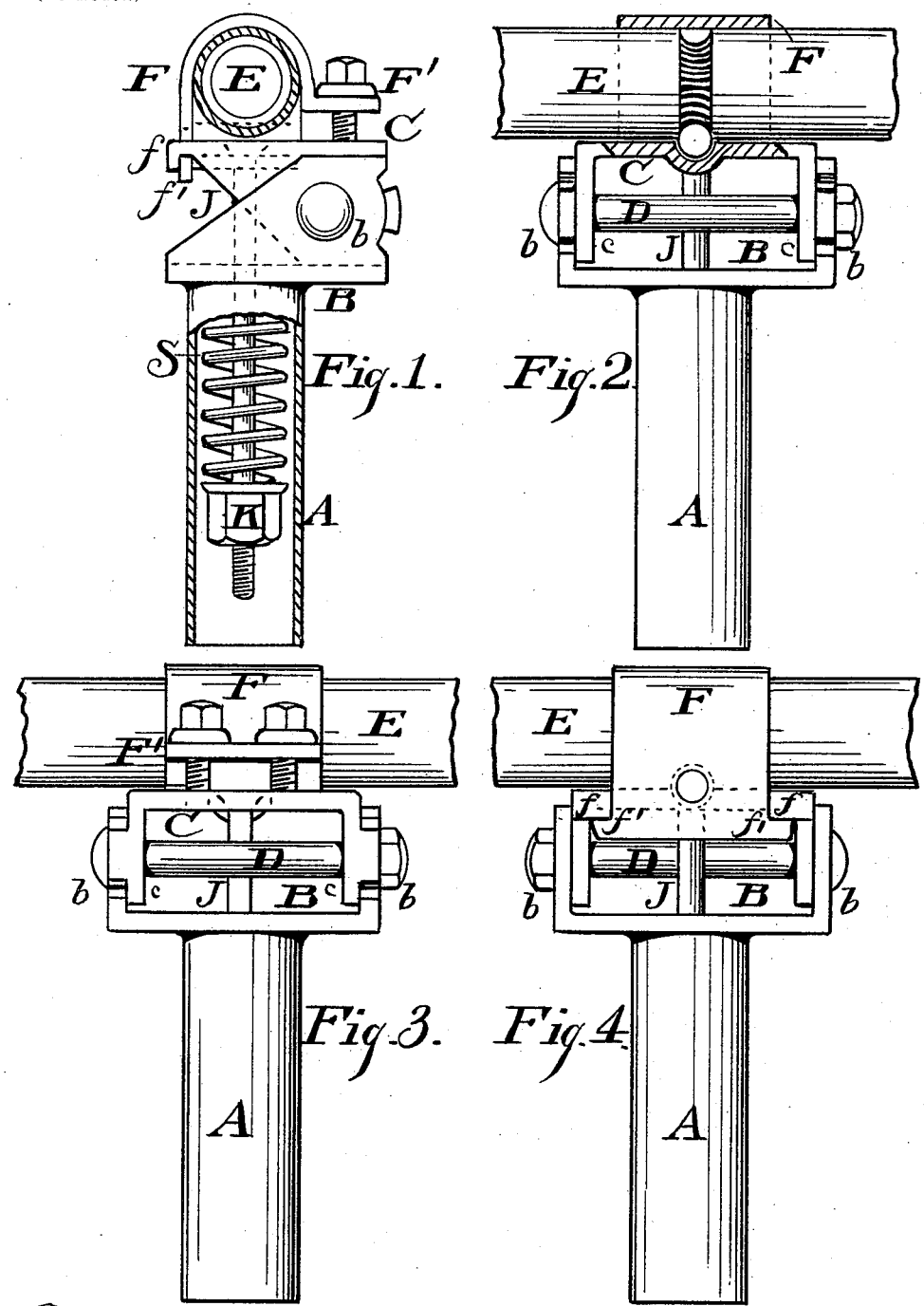

WILLIAM A. MARBACH, OF CLEVELAND, OHIO.

HANDLE-BAR FOR BICYCLES.

SPECIFICATION forming part of Letters Patent No. 615,868, dated December 13, 1898.

Application filed September 10, 1897. Serial No. 651,189. (No model.)

*To all whom it may concern:*

Be it known that I, WILLIAM A. MARBACH, a citizen of the United States, residing at Cleveland, in the county of Cuyahoga and State of Ohio, have invented certain new and useful Improvements in Handle-Bars for Bicycles, of which the following is a specification.

This invention relates to handle-bars for bicycles, and has for its object to provide a cushioned handle-bar whereby the jarring is avoided and the hands and arms of the rider are relieved from its injurious effects.

The invention consists in hinging or pivoting the handle-bar to the bar-stem and in providing a spring-bearing in the stem acting upon the handle-bar for accomplishing the said results.

It also consists in the means for nicely adjusting the inclination of the handle-bar.

The invention is constructed and arranged to operate substantially as hereinafter described, and pointed out in the claim.

In the accompanying drawings, Figure 1 is a side elevation, partly in section, of my new handle-bar joint, showing the hinge, the spring, and the adjusting attachments. Fig. 2 is a transverse vertical section of the same. Fig. 3 is a front side elevation, and Fig. 4 is a rear side elevation, of the handle-bar and the new joint.

A represents a handle-bar stem which is secured to the fork-stem. B is a head-plate attached to the top end of said stem A, provided with end flanges $b\ b$. C is a plate also having end flanges $c\ c$, which fit inside of the flanges $b\ b$ of the head B. D is a bolt placed through eyes in the said flanges which joins the head B and plate C firmly together and which constitutes a hinge-joint. To the plate C the handle-bar E is attached by means of a clip F.

$f\ f$ are lugs on the corners of the clip, which catch under lugs or projections $f'\ f'$ on the front side of the plate C. The opposite side of the clip has a lip F', which stands a short distance above the plate and through which bolts $g\ g$ are placed and are screwed into the plate C, thus forming a clamp for holding the bar onto the plate. In the forward and central part of the plate C is formed a half-round recess $h$, and in the middle part of the bar E is formed an annular half-round screw-threaded groove $e$. I is a screw fitted to lie in the recess $h$ and have its upper side mesh with the screw-threads in the said groove $e$. The screw is retained in place by the front side of the clip F and in which is made a round hole $i$ of less diameter than the screw, through which a screw-driver may be inserted for turning the screw when required.

J is a rod or bolt having its head held in a seat in the plate C. The bolt passes down through a hole in the head-plate B into the hollow stem A, and its lower end is screw-threaded and carries a nut K. S is a spring on said bolt, bearing against and between the head C and the nut $j$, which comprises a bearing for the handle-bar.

The operation of this improvement is as follows: The pressure upon the handles by the rider depresses them. This causes a contraction of the spring and dispels the rigidity of the bar-support, and thereby destroys the jarring effects upon the hands and arms of the rider.

Having described my invention, I claim—

In a bicycle handle-bar, a hollow stem A, a plate B on said stem, flanges $b\ b$ on the ends of said plate B, a plate C having flanges $c\ c$ bearing against the inside faces of the flanges $b\ b$, a bolt D passed through said flanges, a clip F, having lugs $f\ f$ catching under lugs $f'\ f'$ on the plate C, a lip F' on said clip, bolts $g\ g$ through said lip F' and screwed into the plate C, a bolt J having its head held in a seat in the plate C, said bolt J extending through the plate B and down into the hollow stem A, a spring S on said bolt J below the head, and a nut K on the lower end of the bolt and bearing against the lower end of the spring, all constructed and adapted to operate substantially as described.

WILLIAM A. MARBACH.

Witnesses:
GEO. W. TIBBITTS,
L. W. FORD.